US009415626B2

(12) United States Patent
Lee et al.

(10) Patent No.: US 9,415,626 B2
(45) Date of Patent: Aug. 16, 2016

(54) MANUFACTURING METHOD OF DECO GLASS PANEL AND GLASS PANEL USING THE SAME

(71) Applicant: LG Electronics Inc., Seoul (KR)

(72) Inventors: Jinsoo Lee, Changwon-si (KR); Seungphil Lee, Changwon-si (KR); Changmin Cho, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/627,176

(22) Filed: Feb. 20, 2015

(65) Prior Publication Data

US 2015/0165815 A1 Jun. 18, 2015

Related U.S. Application Data

(62) Division of application No. 13/688,994, filed on Nov. 29, 2012, now abandoned.

(30) Foreign Application Priority Data

Nov. 30, 2011 (KR) ........................ 10-2011-0127164

(51) Int. Cl.
| | |
|---|---|
| *B32B 3/02* | (2006.01) |
| *B44C 5/04* | (2006.01) |
| *C03C 17/34* | (2006.01) |
| *C03C 3/066* | (2006.01) |
| *C03C 8/04* | (2006.01) |
| *C03C 17/04* | (2006.01) |
| *B44C 3/02* | (2006.01) |
| *B44F 7/00* | (2006.01) |
| *B44C 1/10* | (2006.01) |
| *B41M 3/00* | (2006.01) |

(52) U.S. Cl.
CPC ............... *B44C 5/0407* (2013.01); *B44C 1/10* (2013.01); *B44C 3/02* (2013.01); *B44F 7/00* (2013.01); *C03C 3/066* (2013.01); *C03C 8/04* (2013.01); *C03C 17/04* (2013.01); *C03C 17/34* (2013.01); *B41M 3/006* (2013.01); *C03C 2217/72* (2013.01); *C03C 2218/17* (2013.01); *C03C 2218/34* (2013.01); *C03C 2218/365* (2013.01); *Y10T 428/24851* (2015.01); *Y10T 428/24926* (2015.01)

(58) Field of Classification Search
CPC ............ Y10T 428/24802; Y10T 428/24926; C03C 8/02; C03C 8/04; C03C 17/04; C03C 17/34; C03C 2217/72
See application file for complete search history.

(56) References Cited

U.S. PATENT DOCUMENTS

| | | |
|---|---|---|
| 3,713,958 A | 1/1973 | McCracken |
| 4,267,209 A | 5/1981 | Hanson |

(Continued)

FOREIGN PATENT DOCUMENTS

| | | |
|---|---|---|
| CN | 2611188 Y | 4/2004 |
| CN | 101092308 A | 12/2007 |

(Continued)

*Primary Examiner* — Elizabeth Mulvaney
(74) *Attorney, Agent, or Firm* — Birch, Stewart, Kolasch & Birch, LLP

(57) ABSTRACT

A deco glass panel including a mother substrate formed of glass, a glass powder layer welded on the mother substrate and a rear surface pattern disposed on a rear surface of the mother substrate, wherein the rear surface pattern is located within an outline of the glass powder layer when viewed from the front surface of the mother substrate.

5 Claims, 3 Drawing Sheets

(56) References Cited

U.S. PATENT DOCUMENTS

| | | |
|---|---|---|
| 5,145,726 A | 9/1992 | Sakuramoto et al. |
| 5,342,810 A | 8/1994 | Merigaud et al. |
| 5,525,137 A | 6/1996 | DiCarlo |
| 5,827,581 A | 10/1998 | Cobb et al. |
| 2003/0126951 A1 | 7/2003 | Sanders et al. |
| 2006/0150680 A1 | 7/2006 | Hill et al. |
| 2008/0139375 A1* | 6/2008 | Wennemann ............ C03C 8/02 501/59 |
| 2009/0104387 A1 | 4/2009 | Postupack et al. |
| 2010/0083705 A1 | 4/2010 | Jeon |
| 2011/0277505 A1* | 11/2011 | Sakoske ................. C03C 8/06 65/60.53 |
| 2013/0164483 A1* | 6/2013 | Cites ................. B32B 17/10036 428/68 |

FOREIGN PATENT DOCUMENTS

| | | |
|---|---|---|
| CN | 201189797 Y | 2/2009 |
| CN | 201211819 Y | 3/2009 |
| DE | 19951483 A1 | 7/2000 |
| DE | 202006002830 U1 | 6/2006 |
| EP | 0558942 A1 | 9/1993 |
| EP | 0974714 A2 | 1/2000 |
| EP | 2248676 A1 | 11/2010 |
| GB | 598336 A | 2/1948 |
| GB | 2323333 A | 9/1998 |
| JP | 2000-313640 A | 11/2000 |

\* cited by examiner

MANUFACTURING METHOD OF DECO GLASS PANEL AND GLASS PANEL USING THE SAME

CROSS-REFERENCE TO RELATED APPLICATIONS

This application is a divisional of copending U.S. application Ser. No. 13/688,994, filed Nov. 29, 2012, which claims the benefit of the earlier filing date and right of priority to Korean Application No. 10-2011-0127164, filed on Nov. 30, 2011. The contents of all of these applications are hereby incorporated by reference as fully set forth herein in their entirety.

BACKGROUND OF THE INVENTION

1. Field of the Invention

The present disclosure relates to a method of manufacturing a deco glass panel, and a glass panel using the method.

2. Background of the Invention

Generally, a body of a home appliance such as a refrigerator, an air conditioner or a washing machine is formed of a metallic panel or a synthetic resin panel. However, in a high-quality product in which design is regarded to be important, finishing materials formed of various materials are used. As the finishing materials, a glass panel may be used, for instance. The glass panel is applied to high-price products due to its superior gloss degree and hardness compared to a metallic panel or a synthetic resin panel.

In some cases, the glass panel is provided with specific patterns. To this end, a sheet having desired patterns or designs thereon is attached to the glass panel. However, in this case, a cubic effect (3D effect) is not good, and the patterns or designs are not well implemented.

In order to solve such problems, paint or pigment is directly applied to the surface of the glass panel, thereby implementing designs or patterns. However, such designs or patterns may be easily separated from the glass panel due to the characteristics of the glass. Further, if the glass pattern is used for a long time, the designs or patterns may be contaminated to lower the appearance. Furthermore, it is difficult to form a 3D pattern having a concavo-convex feeling due to the limitations of the paint and the pigments in the material. The 3D effect can be implemented by increasing the thickness of implemented patterns. However, the durability and contamination resistance are low, due to the low strength of the patterns formed of paint or pigments.

SUMMARY OF THE INVENTION

Therefore, an aspect of the detailed description is to provide a method of manufacturing a deco glass panel capable of preventing predetermined designs or patterns implemented on a glass panel from being separated from the glass panel, and capable of implementing patterns having a concavo-convex feeling.

Another aspect of the detailed description is to provide a glass panel capable of preventing predetermined designs or patterns applied thereonto from being separated therefrom, and capable of having patterns which provide a concavo-convex feeling.

To achieve these and other advantages and in accordance with the purpose of this specification, as embodied and broadly described herein, there is provided a method of manufacturing a deco glass panel, the method comprising: a pattern forming step of applying an adhesive onto a mother substrate of a glass panel in a prescribed pattern; a glass powder applying step of applying glass powder onto the surface of the mother substrate of the glass panel having the adhesive applied thereonto; an adhesive hardening step of hardening the adhesive applied onto the glass panel by heating the glass panel in a state where the glass powder has been applied; a preheating step of heating the glass panel at a temperature lower than a melting point of the glass powder; a welding step of welding the glass panel at a temperature higher than a melting point of the glass powder but lower than a melting point of the mother substrate; a cooling step of cooling the glass panel; and an attaching step of attaching a prescribed rear surface pattern on a rear surface of the glass panel.

In the present invention, patterns or designs may be formed on the surface of the glass panel not by using the conventional pigment or paint, but by applying glass powder to the glass panel in a desired shape and then by welding the glass powder. Since the patterns are more stably attached to the surface of the glass panel, there is an effect that the glass panel is implemented in the form of cut pieces. This can enhance the productivity.

Further, since the pattern protrudes from the surface of the mother substrate of the glass panel, a cubic effect can be enhanced.

In addition, when a prescribed rear surface pattern is attached to the rear surface of the glass panel, the rear surface pattern appears to protrude from the surface of the mother substrate of the glass panel. Since the rear surface pattern may be formed in various colors by paint or pigments, a cubic pattern having any color or shape may be formed.

In the welding step, the glass powder may not be directly heated to a melting point, but the mother substrate of the glass panel may be preheated. This can prevent separation of the glass powder from the surface of the mother substrate due to a drastic temperature increase.

The rear surface pattern may be formed by applying paint or pigments on the rear surface of the glass panel. Alternatively, the rear surface pattern may be formed by attaching a film onto the rear surface of the glass panel, the film having a rear surface pattern attached thereto.

When viewed from the upper surface of the glass panel, the rear surface pattern may be formed to be within an outline of the glass powder layer. With this configuration, the rear surface pattern can have a cubic effect (3D effect). In this case, the rear surface pattern may be formed to have a width narrower than that of a glass powder pattern. Alternatively, the rear surface pattern may be formed outside an outline of the glass powder layer. In this case, the rear surface pattern may seem to have a cubic shape, or a plane shape, or various shapes. Especially, when the rear pattern has a different color from the mother substrate, the welded glass powder will seem to have the color of the rear pattern which is different from the mother substrate.

In the preheating step, the glass panel may be heated at 440-460° C. for 60-75 seconds. And, in the welding step, the glass panel may be heated at 630-715° C. for 60-75 seconds.

The pattern forming step may include preparing a mesh that is blocked everywhere except for locations of the prescribed patterns; placing the prepared mesh on the mother substrate of the glass panel; applying an adhesive onto the mesh; and removing the mesh.

Since the mesh serves as a mask, applying the adhesive in a desired pattern may be facilitated. Further, through the mesh, the adhesive may have foreign materials removed therefrom, and may be evenly applied on the surface of the mother substrate of the glass panel.

The glass powder may be fabricated in an arbitrary manner. For instance, the glass powder may be prepared by heating a non-lead glass plate, and then by rapidly cooling the non-lead glass plate. The rapidly-cooled non-lead glass plate may be ground into small pieces due to a thermal stress. If the obtained glass powder has a diameter greater than a desired value, the glass powder may undergo an additional grinding process to have a desired diameter. Here, the glass powder may have an average diameter of 0.2-0.35 mm.

The adhesive hardening step may include a pre-hardening step of heating the glass panel to a first temperature; and a primary hardening step of heating the glass panel to a second temperature lower than the first temperature.

Through the adhesive hardening step, dispersion or separation of glass powder from the mother substrate may be prevented which may occur during a glass powder welding step to be later performed. In order to rapidly dry the adhesive, the adhesive can be heated at a high temperature. However, if the adhesive is heated at a high temperature, the adhesive may experience a transformation. On the other hand, if the adhesive is heated at a very low temperature, a drying speed is slow to cause the adhesive to spread on the surface of the mother substrate without maintaining its original pattern any longer. Therefore, for prevention of decomposition of the adhesive, the adhesive may be heated first at a high temperature for hardening to some degree, and then may be heated at a low temperature.

The first temperature may be within the range of 240-260° C., and the second temperature may be within the range of 170-190° C. In the primary hardening step, the glass panel may be heated for a time duration twice as long as that taken in the pre-hardening step.

The glass powder may include, by weight, 11-20% $SiO_2$, 30-35% ZnO, 15-20% $B_2O_3$, 10-18% $NaO_2$, 1-5% $Al_2O_3$, 1-4% $ZrO_2$, 1-4% CaO, and other impurities. The glass powder may further include, by weight, 0.05-0.25% $Fe_2O_3$ and 0.001-0.004% MnO.

The cooling step may include a pre-cooling step of cooling the glass panel by injecting aft or water on the surface of the glass panel; and a primary-cooling step of cooling the glass panel to room temperature by placing the glass panel in air. As the heated glass panel is rapidly cooled and then is slowly cooled to room temperature, the glass panel can have a higher strength.

To achieve these and other advantages and in accordance with the purpose of this specification, as embodied and broadly described herein, there is also provided a deco glass panel, comprising: a mother substrate formed of glass; a glass powder layer welded on the mother substrate; and a rear surface pattern disposed on a rear surface of the mother substrate, wherein the rear surface pattern is formed to be within an outline of the glass powder layer when viewed from the upper surface of the mother substrate.

The glass powder may include, by weight, 11-20% $SiO_2$, 30-35% ZnO, 15-20% $B_2O_3$, 10-18% $NaO_2$, 1-5% $Al_2O_3$, 1-4% $ZrO_2$, 1-4% CaO, and other impurities. The glass powder may further include, by weight, 0.05-0.25% $Fe_2O_3$ and 0.001-0.004% MnO.

A film layer may be additionally provided on a rear surface of the rear surface pattern.

The present invention may have the following advantages.

Firstly, patterns or a design may be formed on the surface of the glass panel not by using the conventional pigments or paint, but by applying glass powder to the glass panel in a desired pattern and then by welding the glass powder. Since the patterns are more stably and firmly attached to the surface of the glass panel, there is an effect that the glass panel is implemented in the form of cut pieces. This can enhance the productivity.

Secondly, as the rear surface pattern attached onto the rear surface of the glass panel seems to protrude from the surface of the mother substrate of the glass panel, a cubic effect can be enhanced in various colors and shapes.

Further, the glass powder layer has a higher hardness, a higher strength, and a higher contamination resistance than the conventional one formed of pigment or paint. Accordingly, the glass powder layer can maintain the initial state despite long-term use.

In the step of welding the glass powder, the glass powder may not be directly heated to a melting point, but the mother substrate of the glass panel may be preheated. This can prevent separation of the glass powder from the surface of the mother substrate due to a drastic temperature increase. As a result, a more uniform and sophisticated welded layer can be implemented.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of a brief description with reference to the drawings, the same or equivalent components will be provided with the same reference numbers, and description thereof will not be repeated.

Hereinafter, a method of manufacturing a deco glass panel according to the present invention will be explained in more detail with reference to the attached drawings.

Figure 1:
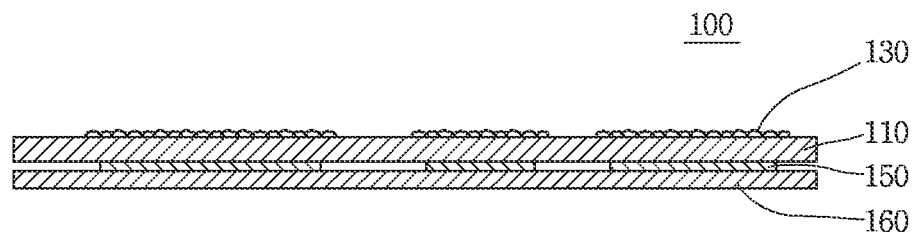
FIG. 1 is a sectional view showing a deco glass panel according to an embodiment of the present invention.

FIG. 1 is a sectional view showing a deco glass panel according to an embodiment of the present invention.

Referring to FIG. 1, the deco glass panel 100 is provided with a mother substrate 110 formed of glass and disposed at the lowest layer. The mother substrate 110 may have various shapes according to a type of an object to which the deco glass panel is mounted. In this embodiment, the deco glass panel 100 has an approximate rectangular shape.

An adhesive layer 120 is disposed on the surface of the mother substrate 110. The adhesive layer 120 is formed by applying an adhesive onto the mother substrate 110 in a prescribed pattern, and then by hardening the adhesive. The adhesive layer 120 serves to fix a glass powder layer 130 to be later explained.

The glass powder layer 130 is formed by welding glass powder. More specifically, glass powder having an average particle size (diameter) of about 0.2-0.35 mm is welded to each other, thereby implementing a single layer.

Rear surface patterns 150 are formed on the rear surface of the mother substrate 110. When viewed from the upper side of FIG. 1, the rear surface pattern 150 is formed to be within an outline of the glass powder layer 130. That is, the rear surface pattern 150 is formed to have a width equal to or smaller than that of the glass powder layer 130. In FIG. 1, the width of the rear surface pattern 150 is narrower than that of the glass powder layer 130.

When viewed from the upper side of the mother substrate 110, the rear surface pattern 150 can be seen by a user through the glass powder layer 130 and the mother substrate 110. Therefore, the rear surface pattern 150 seems to protrude from the surface of the mother substrate 110. This can provide a cubic (3-dimensional) effect to the rear surface pattern 150.

A protection film 160 is attached onto the rear surface of the rear surface pattern 150. The protection film 160 serves to protect the rear surface pattern 150.

The rear surface pattern 150 may be attached to the rear surface of the mother substrate 110 in various manners. For instance, the rear surface pattern 150 may be directly printed onto the rear surface of the mother substrate 110 by a silk screen printing method, etc. Alternatively, the rear surface pattern 150 may be formed by firstly forming a rear surface pattern on the protection film 160, and then attaching the protection film 160 onto the rear surface of the mother substrate 110.

Referring to FIG. 1, a rear surface pattern is firstly printed on the protection film 160, and then the protection film 160 is attached onto the rear surface of the mother substrate 110. If the rear surface pattern 150 is directly printed onto the rear surface of the mother substrate 110, the protection film 160 may not be required.

The glass powder should be easily welded to the mother substrate of the glass panel, and forms the appearance of a home appliance. Therefore, the glass powder should have a relatively uniform shape or color. To this end, the glass powder includes, by weight, 11-20% $SiO_2$, 30-35% $ZnO$, 15-20% $B_2O_3$, 10-18% $NaO_2$, 1-5% $Al_2O_3$, 1-4% $ZrO_2$, and 1-4% $CaO$. Further, the glass powder includes a coloring agent having, by weight, 0.05-0.25% $Fe_2O_3$ and 0.001-0.004% $MnO$. Hereinafter, each component will be explained in more detail.

$SiO_2$ is a component of glass, which is used to obtain a high acid resistance. The $SiO_2$ is used to form stable glass by coexisting $B_2O_3$, an additional component of glass, and is used within the range of 11-20%. As the content of $SiO_2$ increases, a softening point of glass rises, and workability and operability are degraded to implement an uneven welded layer. On the other hand, if the content of $SiO_2$ decreases, acid resistance is lowered. Accordingly, the content of $SiO_2$ was determined to be within the range of 11-20%.

$ZnO$ serves to lower a softening point of glass. That is, as the content of $ZnO$ increases, a softening point of glass is lowered to cause glass powder to be welded to each other even at a low temperature. Therefore, in the present invention, the content of $ZnO$ was determined to be within the range of 30-35%. If the content of $ZnO$ exceeds 35%, chemical durability may be lowered, or glass may become unstable. On the other hand, if the content of $ZnO$ is less than 30%, a softening point is too high to lower the operability.

$B_2O_3$ is a component of glass, and implements the fluidity of glass during a welding process by facilitating melting of glass. This can enhance smoothness of the surface of welded glass. Further, $B_2O_3$ prevents an excessive increase of a thermal expansion coefficient of glass, thereby preventing separation of glass particles from the mother substrate 110. Accordingly, if the content of $B_2O_3$ is less than 15%, the fluidity of glass is insufficient. This may cause the deco glass panel to not have a suitable appearance. On the other hand, if the content of $B_2O_3$ exceeds 15%, acid resistance is low and the stability of glass is lowered.

$NaO_2$ also serves to enhance the solubility when glass is melted, and to lower a softening point. In this embodiment, the minimum content of $NaO_2$ is 10% for enhanced solubility and welding characteristic. If the content of $NaO_2$ exceeds 18%, acid resistance of glass is lowered and a thermal expansion coefficient is excessively increased. Therefore, the maximum content of $NaO_2$ is 18%. $K_2O$ or $Li_2O$ having a similar characteristic as $NaO_2$ may be added to glass.

$Al_2O_3$ serves to stabilize glass, or to enhance chemical durability, gloss and hardness. As the content of $Al_2O_3$ is great, the effect is enhanced but a softening temperature is increased. Therefore, in this embodiment, the content of $Al_2O_3$ was determined to be within the range of 1-5%.

$ZrO_2$ serves to enhance acid resistance of glass, and improves a chemical durability. However, if the content of $ZrO_2$ is great, a crystallization speed is increased during a welding process. This may cause difficulty in a sintering process. Therefore, in this embodiment, the content of $ZrO_2$ was determined to be within the range of 1-4%.

$CaO$ serves to stabilize glass, and is advantageous to produce refined and uniform glass. However, if the content of $CaO$ is too great, glass becomes unstable. Therefore, the content of $CaO$ was determined to be within the range of 1-4%.

If $CaO$ included in glass is partially substituted by $MgO$, a glass viscosity is lowered at a high temperature, and a thermal expansion coefficient is lowered to enhance workability. In this case, heat resistance is increased. Therefore, the content of $MgO$ was determined to be within the range of 1-4%.

$Fe_2O_3$ and $MnO$ are used as a colorant, and the content thereof is determined according to a desired color. In this embodiment, the content of $Fe_2O_3$ is determined to be within the range of 0.05-0.25%, and the content of $MnO$ is determined to be within the range of 0.001-0.004%.

Hereinafter, a method of manufacturing a deco glass panel will be explained in more detail.

Figure 2:
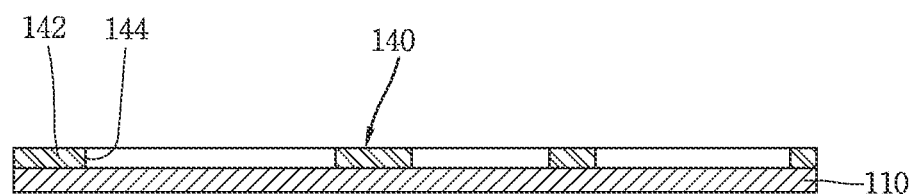
FIGS. 2 to 5 are views showing a method of manufacturing a deco glass panel according to an embodiment of the present invention.
Figure 3:
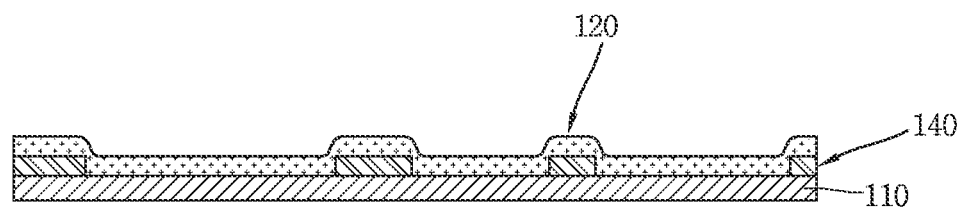

As shown in FIG. 2, a mother substrate 110 of a glass panel is prepared. Then, masks 140 formed of a mesh material are disposed on the surface of the mother substrate of the glass panel 110. The mask 140 includes a closed portion 142 having a blocked mesh, and an open portion 144 having an open mesh. The open portion 144 is formed to have the same shape as a pattern to be formed on the mother substrate 110 of the glass panel. If an adhesive is applied onto the mask 140 in a state where the mask 140 has been attached onto the mother substrate 110, the adhesive supplied to the open portion 144 is applied onto the surface of the mother substrate 110 as shown in FIG. 3. However, the adhesive supplied to the closed portion 142 is not applied onto the surface of the mother substrate 110.

Figure 4:
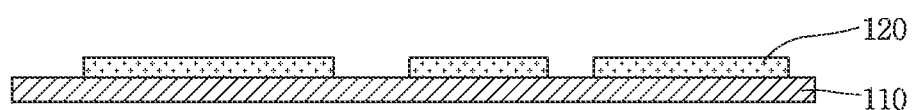
Figure 5:
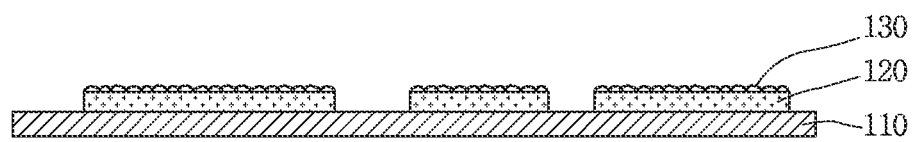

If the mask 140 is removed in such state, only the adhesive layer 120 remains on the surface of the mother substrate 110 as shown in FIG. 4. Then, glass powder is applied onto the mother substrate 110, and then is removed. As a result, the glass powder remains on the portion of the mother substrate 110 where the adhesive layer 120 is located as shown in FIG. 5.

The glass powder may be prepared by grinding an unleaded glass plate by any method. Alternatively, the glass powder may be prepared by rapidly cooling a heated unleaded glass plate. More specifically, if a manufactured unleaded glass plate, or an unleaded glass plate which is in a heated state during a manufacturing process is rapidly cooled, the unleaded glass plate is separated into fine particles due to a thermal stress. In this embodiment, the glass powder has an average particle size of 0.2-0.35 mm. If the average particle size is less than 0.2 mm, the glass particles may fly to the air due to a light weight thereof during a manufacturing process, and texture and materiality may not be implemented during a welding process. On the other hand, if the average particle size exceeds 0.35 mm, it takes a lot of time to perform a welding process.

If the average particle size of glass powder ground by a thermal stress is not within the above range, an additional grinding process may be performed to implement a desired average particle size. Each composition of the glass powder used in this embodiment, and each content thereof, are shown in the following table 1.

TABLE 1

| Component | Content (wt %) |
|---|---|
| $SiO_2$ | 17.2 |
| $Al_2O_3$ | 3.15 |
| CaO | 2.83 |
| MgO | 2.38 |
| $Fe_2O_3$ | 0.15 |
| $K_2O$ | 1.72 |
| $Na_2O$ | 15.6 |
| ZnO | 33.8 |
| $ZrO_2$ | 2.84 |
| BaO | 0.01 |
| SrO | 0.004 |
| MnO | 0.002 |
| LiO | 0.06 |
| $TiO_2$ | 0.13 |
| $B_2O_3$ | 18.7 |

The mother substrate 110 of the glass panel prepared in this embodiment is heated at a temperature of about 250° C. The temperature is lower than a softening point of the glass powder, which enables the adhesive layer to be pre-hardened. After the pre-hardening, the primary hardening is performed at a temperature of about 180° C. Through the hardening process of the adhesive, the glass powder is prevented from being separated from the surface of the mother substrate 110 in a welding step to be later performed.

In the pre-hardening step, the adhesive may be heated at a temperature of 240-260° C. If the heating temperature is lower than 240° C., a hardening speed is slow to lower the efficiency of pre-hardening. On the other hand, if the heating temperature is higher than 260° C., the characteristic of the adhesive may be degraded.

The hardening speed is accelerated as the temperature in the hardening step rises. However, if the temperature is excessively high, the adhesive may experience decomposition. If the hardening time is long, the pattern of the adhesive may be transformed as the adhesive applied onto the mother substrate 110 spreads on the surface of the mother substrate 110. Therefore, it is preferable to rapidly harden the adhesive at a temperature higher than a preset temperature suitable for hardening, so that the surface of the adhesive can be hardened first. This can shorten the hardening time, and allow the hardening to be effectively performed. Time taken to perform pre-hardening may be set to be half of the time taken to perform primary hardening.

The heating temperature in the primary hardening step is set to be within the range of 170-190° C. If the temperature is lower than 170° C., the hardening speed is too slow to cause the adhesive to spread. On the other hand, if the temperature is higher than 190° C., the adhesive may experience decomposition. Especially, since time taken to perform primary hardening is two times that taken to perform pre-hardening, the heating temperature in the primary hardening step is set to be lower than that in the pre-hardening step.

If the adhesive layer is completely hardened, the glass powder is welded to be sintered (welding process). Before the welding process, the mother substrate 110 is preheated at about 450° C. for 60-75 seconds, and then is heated at 630-715° C. for 60-75 seconds. The preheating is performed so as to prevent scattering (dispersing) of the glass powder from the surface of the mother substrate 110 due to a drastic temperature increase, and thus to prevent transformation of the pattern. The preheating temperature is set to be lower than a melting point of the glass powder, but the welding temperature is set to be higher than the melting point of the glass powder. Further, the adhesive layer will vaporized by the heat and then disappear.

If the glass powder is completely welded, the glass panel is cooled (cooling step). The cooling step includes a rapid cooling step of injecting air at room temperature onto the surface of the glass panel using an air injection nozzle, and a slow cooling step of cooling the glass panel to room temperature by placing the glass panel in an open space. Through the rapid cooling and the slow cooling, the glass panel is thermally processed to have an enhanced strength.

Once the glass panel is completely cooled, the rear surface pattern 150 is attached onto the rear surface of the mother substrate 110 of the glass panel. The rear surface pattern 150 may be formed by directly printing a rear surface pattern on the rear surface of the mother substrate 110 of the glass panel. Alternatively, as shown in FIG. 1, the rear surface pattern 150 may be formed by firstly forming a rear surface pattern on a protection film, and then attaching the protection film onto the rear surface of the mother substrate 110 of the glass panel.

Figure 6:
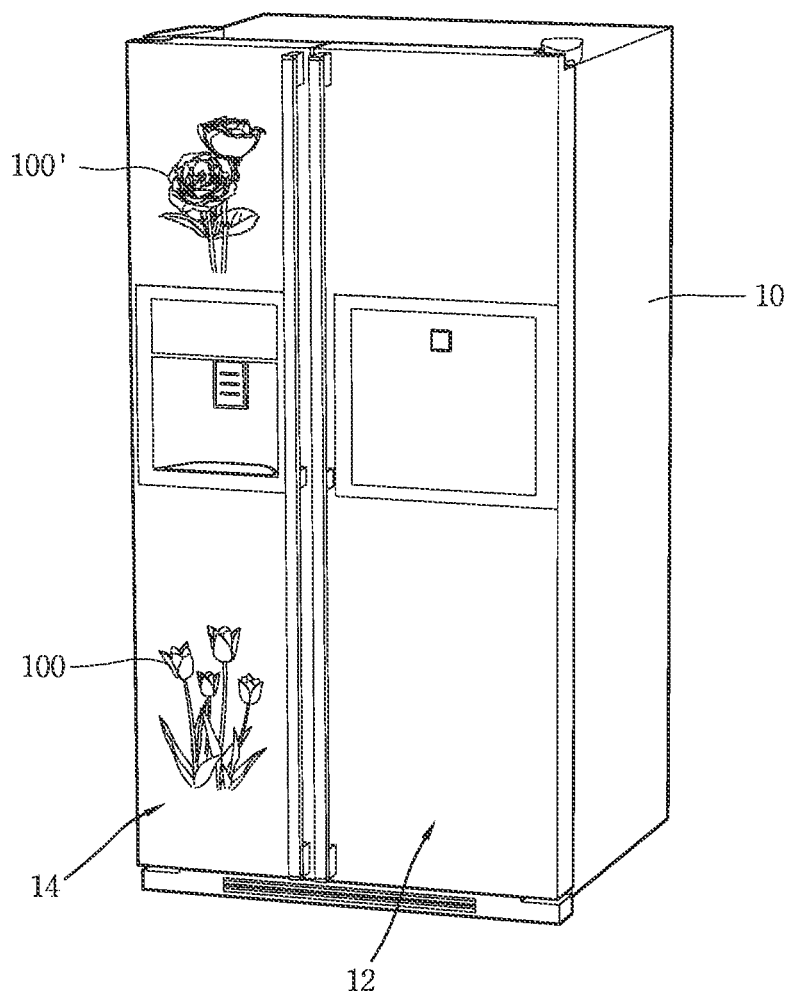
FIG. 6 is a perspective view showing a refrigerator having a door to which the deco glass panel of FIG. 1 has been applied.

The manufactured glass panel may be used to decorate home appliances such as a refrigerator, a washing machine, a dish washer and an air conditioner. FIG. 6 is a perspective view schematically showing the appearance of a refrigerator to which the deco glass panel 100 has been applied. Referring to FIG. 6, two glass panels 100 and 100 having different rear surface patterns are attached to the upper and lower parts of a refrigerating chamber door 14, one of two doors 12 and 14 disposed on the front surface of a refrigerator body 10.

The rear surface patterns appear to be more concavo-convexed from the surface of the glass panel than the conventional ones simply printed on the surface of the glass panel by paint or pigments. This can provide a cubic (3-dimensional) effect to a user to thus enhance the appearance.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A deco glass panel, comprising:
a mother substrate formed of glass;
a glass powder layer welded on the mother substrate; and
a rear surface pattern disposed on a rear surface of the mother substrate,
wherein the rear surface pattern is located within an outline of the glass powder layer when viewed from the front surface of the mother substrate,
wherein the glass powder comprises, by weight, 11-20% $SiO_2$, 30-35% ZnO, 15-20% $B_2O_3$, 10-18% $Na_2O$, 1-5% $Al_2O_3$, 1-4% $ZrO_2$, 1-4% CaO, 0.05-0.25% $Fe_2O_3$ and 0.001-0.004% MnO and other impurities.

2. The deco glass panel of claim 1, wherein the glass powder further comprises, by weight, 0.05-0.25% $Fe_2O_3$ and 0.001-0.004% MnO.

3. The deco glass panel of claim 1, wherein a film layer is additionally provided on a rear surface of the rear surface pattern.

4. A deco glass panel, comprising:
a mother substrate formed of glass;
a glass powder layer welded on the mother substrate; and
a film disposed on a rear surface of the mother substrate,
wherein the film has a prescribed surface pattern with a different color from a ground color of the film and the rear surface pattern has the same shape of the glass powder layer,
wherein the glass powder comprises, by weight, 11-20% $SiO_2$, 30-35% ZnO, 15-20% $B_2O_2$, 10-18% $Na_2O$, 1-5% $Al_2O_3$, 1-4% $ZrO_2$, 1-4% CaO, 0.05-0.25% $Fe_2O_3$ and 0.001-0.004% MnO and other impurities.

5. The deco glass panel of claim 4, wherein the prescribed surface pattern is formed to be within an outline of the glass powder layer when viewed from an upper surface of the mother substrate.

* * * * *